(No Model.)
W. W. TYLER.
FEED WATER HEATER AND PURIFIER.
No. 333,489. Patented Dec. 29, 1885.
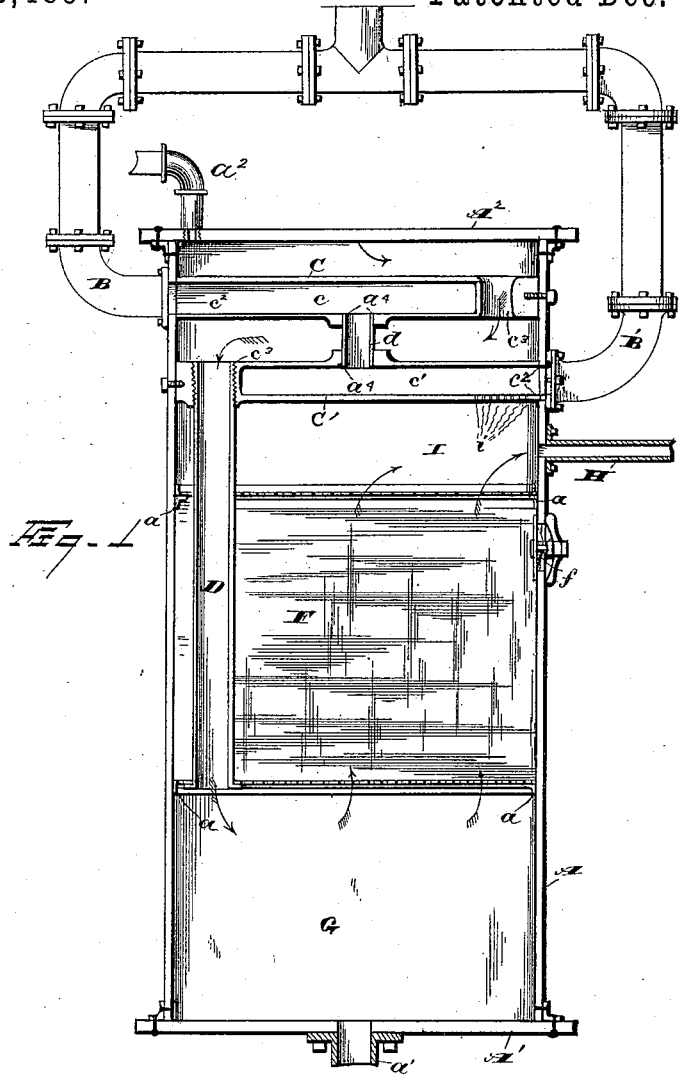
WITNESSES
INVENTOR

UNITED STATES PATENT OFFICE.

WILLIAM W. TYLER, OF CLEVELAND, OHIO.

FEED-WATER HEATER AND PURIFIER.

SPECIFICATION forming part of Letters Patent No. 333,489, dated December 29, 1885.

Application filed October 22, 1885. Serial No. 180,603. (No model.)

*To all whom it may concern:*

Be it known that I, WILLIAM W. TYLER, of Cleveland, in the county of Cuyahoga and State of Ohio, have invented certain new and useful Improvements in Combined Feed-Water Heater and Purifier; and I do hereby declare the following to be a full, clear, and exact description of the invention, such as will enable others skilled in the art to which it pertains to make and use the same.

My invention relates to improvements in a combined feed-water heater and purifier; and it consists in certain features of construction, and in combination of parts, hereinafter described, and pointed out in the claims.

In the accompanying drawings, Figure 1 is a side elevation, in section, of my improved heater and purifier. Fig. 2 is a plan view of one of the hollow disks employed for heating.

A represents the shell, that is preferably cylindrical in form, and is usually made of plate metal. The heads A' and A² are usually secured by bolts, that may be removed when it is necessary to have access to the inside of the structure. The head A' has attached a pipe, $a'$, of considerable size, for discharging sediment. This pipe is provided, in the usual manner, with stop-valves. (Not shown.) The head A² has attached the induction feed-water pipe $a^2$.

Steam-pipes B and B' are connected with the shell, as shown, and may be connected together, or may extend in separate line to the boiler, if preferred. The pipe B, by means of a suitable opening in the shell, is in open relation with the chamber $c$ of the hollow disk C, and the pipe B' leads in like manner to the chamber $c'$ of the disk C'. These two disks are usually cast from the same pattern, and are placed in the reverse position shown, each having lateral openings $c^2$, and each having a vertical opening, $c^3$, that of the lower disk being threaded to receive the pipe D.

A pipe, $d$, is screwed into the central opening, $c^4$, of the disks, connecting the chambers $c$ and $c'$.

E are screens, that rest, respectively, on the ribs or angle-irons $a$, the latter being secured to the shell.

Between the screens is the filtering-chamber F, that is filled with any suitable filtering material.

A hand-hole plate, $f$, is provided, and by removing which access is had to the chamber F for charging or removing the filtering material.

As shown, the pipe D leads down on one side through the filtering-chamber and discharges into the sediment-chamber G, that, as aforesaid, is drained by the pipe $a'$. The eduction feed-pipe H, leading to the boiler, is attached to the shell, and is in open relation with the chamber I above the filtering-chamber.

In operating the device live steam is admitted to the chambers $c$ and $c'$ through the pipes B and B', and the feed-water forced in through the pipe $a^2$ falls upon and spreads on the disk C, and passes from thence through the opening $c^3$, fills the space between the disks, and then passes through the pipe D to the sediment-chamber. As the chamber F becomes filled with water, the latter is forced up through the filtering-chamber to the chamber I, and as this chamber becomes filled the water comes in contact with the bottom of the disk C, and is eventually forced out through the pipe H to the boiler. The water, in its contact with the steam-heated disks, becomes highly heated, and its movement down through the pipe D tends to precipitate the sediment to the bottom of the chamber G, from whence it is drawn off through the pipe $a'$. The water formed by the condensation of steam in the chambers $c$ and $c'$ passes out through drip-holes $i$, made in the lower wall of the lower disk, and is added to the feed-water.

What I claim is—

1. In a feed-water heater and purifier, the combination, with a container having a sediment-chamber below and a filtering-chamber next above the sediment-chamber, of the hollow disks C and C', the parts being arranged substantially as set forth.

2. In a feed-water heater and purifier, the combination, with the hollow disks C and C', said disks having side openings connecting, respectively, with steam-pipes, and a pipe connecting the chambers of said disks, of an induction feed-water pipe arranged to discharge upon the upper disk, vertical openings through the respective disks, and a pipe for conducting
5 the heated water to the sediment-chamber, the parts being arranged substantially as set forth.

In testimony whereof I sign this specification, in the presence of two witnesses, this 10th day of October, 1885.

WILLIAM W. TYLER.

Witnesses:
CHAS. H. DORER,
ALBERT E. LYNCH.